United States Patent
Kupiszewski

(10) Patent No.: US 10,006,369 B2
(45) Date of Patent: Jun. 26, 2018

(54) METHOD AND SYSTEM FOR RADIAL TUBULAR DUCT HEAT EXCHANGERS

(71) Applicant: GENERAL ELECTRIC COMPANY, Schenectady, NY (US)

(72) Inventor: Thomas Kupiszewski, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 411 days.

(21) Appl. No.: 14/742,970

(22) Filed: Jun. 18, 2015

(65) Prior Publication Data
US 2015/0377135 A1    Dec. 31, 2015

Related U.S. Application Data

(60) Provisional application No. 62/018,902, filed on Jun. 30, 2014.

(51) Int. Cl.
*F02C 7/12* (2006.01)
*F02C 7/18* (2006.01)
(Continued)

(52) U.S. Cl.
CPC .............. *F02C 7/18* (2013.01); *F01D 25/12* (2013.01); *F02C 3/04* (2013.01); *F02C 7/14* (2013.01);
(Continued)

(58) Field of Classification Search
CPC .... F01D 25/12; F02C 3/04; F02C 7/14; F02C 7/18; F05D 2220/32; F05D 2230/60;
(Continued)

(56) References Cited

U.S. PATENT DOCUMENTS 2,479,071 A    8/1949   Henstridge
3,528,250 A *  9/1970   Johnson .................. F02C 7/185
                                                60/262
(Continued)

FOREIGN PATENT DOCUMENTS

CA        2415536 A1    6/2004
DE   102005049067 A1    4/2007
(Continued)

OTHER PUBLICATIONS

European Search Report and Opinion issued in connection with Related EP Application No. 16159798.4 dated Aug. 30, 2016.
(Continued)

*Primary Examiner* — Jesse Bogue
(74) *Attorney, Agent, or Firm* — General Electric Company; Pamela Kachur

(57) ABSTRACT

A method and system for a heat exchanger are provided. The heat exchanger includes a plurality of arcuate heat exchanger segments, each including a first header configured to extend circumferentially about at least a portion of a circumference of an internal surface of a fluid duct. The heat exchanger also includes a second header configured to extend circumferentially about the portion spaced axially apart from the first header in a direction opposite of fluid flow through the fluid duct and a first plurality of heat exchanger tubes extending generally axially between the first header and the second header, the first plurality of heat exchanger tubes each including a first flow path separate from a second flow path of any other of the first plurality of heat exchanger tubes, the first flow path changing direction along the flow path from the first header to the second header.

27 Claims, 9 Drawing Sheets

(51) Int. Cl.
*F02C 3/04* (2006.01)
*F01D 25/12* (2006.01)
*F02C 7/14* (2006.01)
*F28D 7/16* (2006.01)

(52) U.S. Cl.
CPC ........ *F28D 7/1607* (2013.01); *F05D 2220/32* (2013.01); *F05D 2230/60* (2013.01); *F05D 2250/71* (2013.01); *F05D 2260/213* (2013.01); *Y02T 50/671* (2013.01); *Y02T 50/675* (2013.01)

(58) Field of Classification Search
CPC ........... F05D 2250/71; F05D 2260/213; F28D 7/1607; Y02T 50/671; Y02T 50/675
See application file for complete search history.

(56) References Cited

U.S. PATENT DOCUMENTS

| | | | |
|---|---|---|---|
| 3,735,588 A * | 5/1973 | Moskowitz | F28D 7/08 |
| | | | 165/135 |
| 3,841,271 A | 10/1974 | Harris, Jr. et al. | |
| 3,885,942 A | 5/1975 | Moore | |
| 3,948,317 A | 4/1976 | Moore | |
| 4,137,705 A * | 2/1979 | Andersen | F02C 7/14 |
| | | | 60/39.08 |
| 4,246,959 A | 1/1981 | Byrne | |
| 4,275,785 A | 6/1981 | Kerivan | |
| 4,638,857 A | 1/1987 | Fournier | |
| 4,676,305 A | 6/1987 | Doty | |
| 4,785,879 A * | 11/1988 | Longsworth | F25B 9/02 |
| | | | 165/147 |
| 4,854,380 A | 8/1989 | Yoshida et al. | |
| 4,880,055 A | 11/1989 | Niggemann et al. | |
| 5,033,542 A | 7/1991 | Jabs | |
| 5,123,242 A | 6/1992 | Miller | |
| 5,243,815 A | 9/1993 | Maier et al. | |
| 5,363,654 A | 11/1994 | Lee | |
| 5,511,613 A | 4/1996 | Mohn et al. | |
| 5,544,700 A | 8/1996 | Shagoury | |
| 5,775,412 A | 7/1998 | Montestruc et al. | |
| 5,820,654 A | 10/1998 | Gottzman et al. | |
| 6,422,306 B1 | 7/2002 | Tomlinson et al. | |
| 6,945,320 B2 | 9/2005 | Harvard, Jr. et al. | |
| 7,255,159 B2 | 8/2007 | Sagasser et al. | |
| 7,343,965 B2 | 3/2008 | Memory et al. | |
| 7,377,100 B2 | 5/2008 | Bruno et al. | |
| 7,779,898 B2 | 8/2010 | Morrison et al. | |
| 7,784,528 B2 | 8/2010 | Ottow et al. | |
| 7,845,159 B2 * | 12/2010 | Venkataramani | F01D 25/12 |
| | | | 165/104.14 |
| 7,861,512 B2 | 1/2011 | Olver et al. | |
| 8,266,888 B2 | 9/2012 | Liu | |
| 8,266,889 B2 | 9/2012 | Coffinberry | |
| 8,381,803 B2 | 2/2013 | Kim et al. | |
| 8,627,667 B2 * | 1/2014 | Lozier | B64D 37/04 |
| | | | 60/267 |
| 8,708,036 B2 | 4/2014 | Ikeda | |
| 8,826,970 B2 | 9/2014 | Shiraichi et al. | |
| 9,249,730 B2 | 2/2016 | Bourassa et al. | |
| 9,631,539 B2 * | 4/2017 | Cho | F28F 9/02 |
| 9,752,835 B2 * | 9/2017 | Waldman | F28F 1/10 |
| 2002/0005275 A1 | 1/2002 | O'Donnell et al. | |
| 2003/0131978 A1 | 7/2003 | Nakano | |
| 2004/0069470 A1 * | 4/2004 | Gorbulsky | F28D 1/0477 |
| | | | 165/158 |
| 2005/0150970 A1 | 7/2005 | Beutin et al. | |
| 2008/0095611 A1 | 4/2008 | Storage et al. | |
| 2009/0049832 A1 * | 2/2009 | Hase | F01N 5/02 |
| | | | 60/320 |
| 2009/0173072 A1 * | 7/2009 | Mastronarde | F28D 7/1623 |
| | | | 60/659 |
| 2010/0170664 A1 * | 7/2010 | Vaisman | F28D 1/05391 |
| | | | 165/151 |
| 2013/0020047 A1 | 1/2013 | Army, Jr. et al. | |
| 2013/0180696 A1 | 7/2013 | Magee et al. | |
| 2014/0027099 A1 | 1/2014 | Sispera et al. | |
| 2014/0116664 A1 | 5/2014 | Landre | |
| 2014/0138051 A1 * | 5/2014 | Cooney | F28F 9/0231 |
| | | | 165/82 |
| 2014/0208768 A1 | 7/2014 | Bacic | |
| 2015/0377135 A1 | 12/2015 | Kupiszewski | |

FOREIGN PATENT DOCUMENTS

| | | |
|---|---|---|
| EP | 0777094 A2 | 6/1997 |
| EP | 1098156 B1 | 5/2001 |
| EP | 1555406 A1 | 7/2005 |
| EP | 2088371 A2 | 8/2009 |
| EP | 2711652 A1 | 3/2014 |
| EP | 2735791 A1 | 5/2014 |
| EP | 2811249 A1 | 12/2014 |
| GB | 400557 A | 10/1933 |
| GB | 2217828 A | 11/1989 |
| JP | 11325753 | 11/1999 |
| JP | 2003166792 A | 6/2003 |
| JP | 2004037020 A | 2/2004 |
| JP | 2006002622 A | 1/2006 |
| JP | 2012117544 A | 6/2012 |
| JP | 2014025695 A | 2/2014 |

OTHER PUBLICATIONS

GE Related Case Form.
U.S. Non-Final Office Action issued in connection with Related U.S. Appl. No. 14/656,789 dated May 16, 2017.
U.S. Notice of Allowance issued in connection with Related U.S. Appl. No. 14/713,363 dated Jun. 14, 2017.
Unofficial English Translation of Japanese Office Action issued in connection with related JP Application No. 2015128237 dated Aug. 2, 2016.
European Search Report and Opinion issued in connection with corresponding EP Application No. 15173911.7 dated Nov. 30, 2015.
European Search Report and Opinion issued in connection with related EP Application No. 15173866.3 dated Dec. 11, 2015.

* cited by examiner

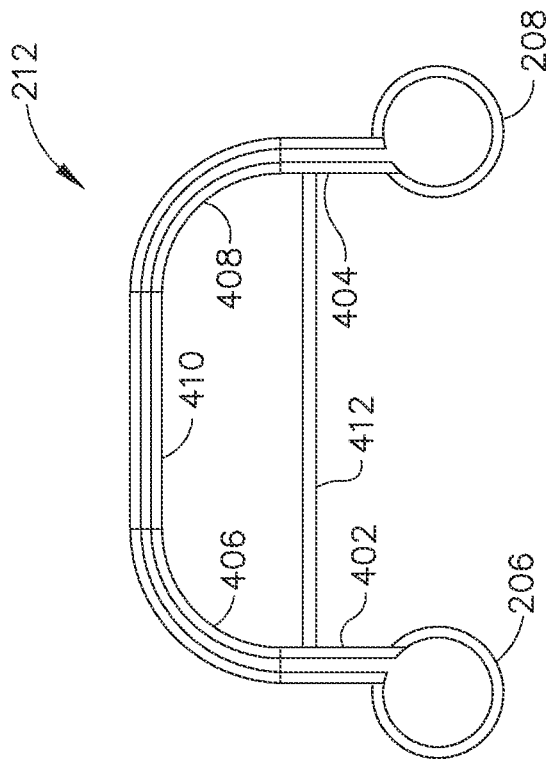
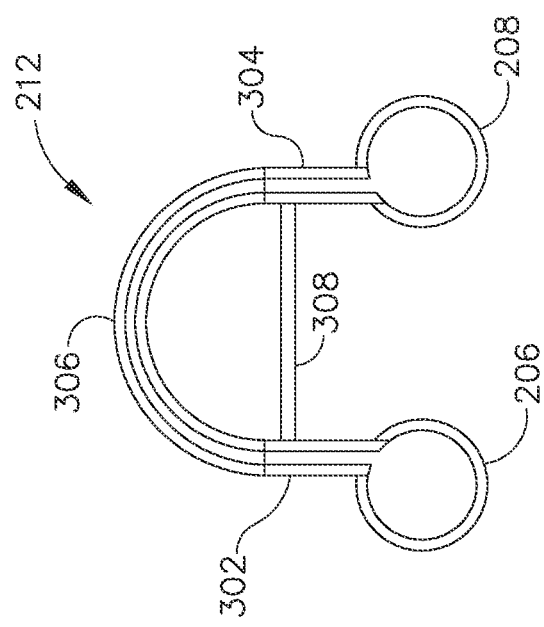

US 10,006,369 B2

METHOD AND SYSTEM FOR RADIAL TUBULAR DUCT HEAT EXCHANGERS

CROSS-REFERENCE TO RELATED APPLICATIONS

This non-provisional application claims the benefit of priority under 35 U.S.C. § 119(e) to U.S. Provisional Patent Application No. 62/018,902, entitled "METHOD AND SYSTEM FOR RADIAL TUBULAR DUCT HEAT EXCHANGERS", filed Jun. 30, 2014, which is herein incorporated in its entirety by reference.

STATEMENT REGARDING FEDERALLY SPONSORED RESEARCH & DEVELOPMENT

The U.S. Government has certain rights in this application as provided for by the terms of Contract Nos. FA8650-09-D-2922 and N00014-10-D-0010 Order 0003.

BACKGROUND

This description relates to heat exchangers, and, more particularly, to a method and system for a circumferential duct heat exchanger.

Gas turbine engines typically include an inlet, a fan, low and high pressure compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as producing useful work to propel an aircraft in flight or to power a load, such as an electrical generator.

During engine operation, significant heat is produced which raises the temperature of engine systems to unacceptable levels. A lubrication system is utilized to facilitate lubricating components within the gas turbine engine. The lubrication system is configured to channel lubrication fluid to various bearing assemblies within the gas turbine engine. During operation, heat is transmitted to the lubrication fluid from heat generated by sliding and rolling friction by components like bearings and seals within the engine.

Gas turbine engines are often used in conjunction with other systems such as systems used in aircraft powered by the gas turbine engine. Some of these systems require cooling to remove heat for improved comfort or operability. For example, pressurized cabins of aircraft often need remove heat from air delivered from an engine bleed to the cabin for habitability and comfort.

To facilitate reducing the operational temperature of the aircraft fluids, such as, but not limited to lubrication fluid and bleed air, at least one known gas turbine engine utilizes in-line heat exchanger bend elements that are disposed in the air stream and that are potentially negatively impacted by the wake of the elements upstream.

BRIEF DESCRIPTION

In one aspect, a heat exchanger includes a plurality of arcuate heat exchanger segments, each including a first header configured to extend circumferentially about at least a portion of a circumference of an internal surface of a fluid duct. The heat exchanger also includes a second header configured to extend circumferentially about the portion spaced axially apart from the first header in a direction opposite of fluid flow through the fluid duct and a first plurality of heat exchanger tubes extending generally axially between the first header and the second header, the first plurality of heat exchanger tubes each including a first flow path separate from a second flow path of any other of the first plurality of heat exchanger tubes, the first flow path changing direction along the flow path from the first header to the second header.

In another aspect, a gas turbine engine includes a core gas turbine engine having an axis of rotation, a fan casing substantially circumscribing the core gas turbine engine, and a heat exchanger assembly positioned within the fan casing. The heat exchanger assembly includes a plurality of arcuate heat exchanger segments that each include a first header configured to extend circumferentially about at least a portion of a circumference of an internal surface of a fluid duct, a second header configured to extend circumferentially about the portion spaced axially apart from the first header in a direction opposite of fluid flow through the fluid duct, and a first plurality of heat exchanger tubes extending generally axially between the first header and the second header, the first plurality of heat exchanger tubes each including a first flow path separate from a second flow path of any other of the first plurality of heat exchanger tubes, both flow paths changing direction along the flow path from the first header to the second header.

In yet another aspect, a method of assembling a modular radial tubular duct heat exchanger includes forming a plurality of arcuate heat exchanger tubes wherein each heat exchanger tube is formed by alternately coupling a plurality of straight tube segments to a plurality of arcuate tube segments to form at least one of the plurality of arcuate heat exchanger tubes and each tube includes an undulating fluid flow path in a radial plane when installed within an annular duct. The method also includes coupling an inlet end of each of the plurality of arcuate heat exchanger tubes to a circumferentially extending inlet plenum and coupling an outlet end of each of the plurality of arcuate heat exchanger tubes to a circumferentially extending outlet plenum. Each arcuate heat exchanger tube is axially offset from each adjacent arcuate heat exchanger tube, each arcuate heat exchanger tube is radially offset from each adjacent arcuate heat exchanger tube.

DRAWINGS

FIGS. 1-10 show example embodiments of the method and apparatus described herein.

FIG. 1 is a schematic illustration of an exemplary gas turbine engine assembly having a longitudinal axis.

FIG. 2 is a side elevation view of a single tube group of a radial tubular duct heat exchanger that may be used with the gas turbine engine shown in FIG. 1.

FIG. 3 is another configuration of a side elevation view of a single tube group of radial tubular duct heat exchanger that may be used with the gas turbine engine shown in FIG. 1.

FIG. 4 is another configuration of a side elevation view of a single tube group of radial tubular duct heat exchanger that may be used with the gas turbine engine shown in FIG. 1.

FIG. 5 illustrates alternate configurations of a radial tubular duct heat exchanger that may be used with the gas turbine engine shown in FIG. 1.

FIG. 6 illustrates another configuration, in which the tubes of the radial tubular duct heat exchanger shown in FIG. 2 may be formed.

FIG. 7 illustrates another configuration, in which the tubes of the radial tubular duct heat exchanger shown in FIG. 2 may be formed.

FIG. 8 is a plan view looking radially inwardly at one of a plurality of tube groups of radial tubular duct heat exchanger.

FIG. 9 is a perspective view of another embodiment of a portion of one of a plurality of tube groups of a radial tubular duct heat exchanger.

FIG. 10 is a flow chart of a method of assembling a modular radial tubular duct heat exchanger that may be used with the duct shown in FIG. 1.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to analytical and methodical embodiments of heat management using radial tubular duct heat exchangers.

Figure 5:
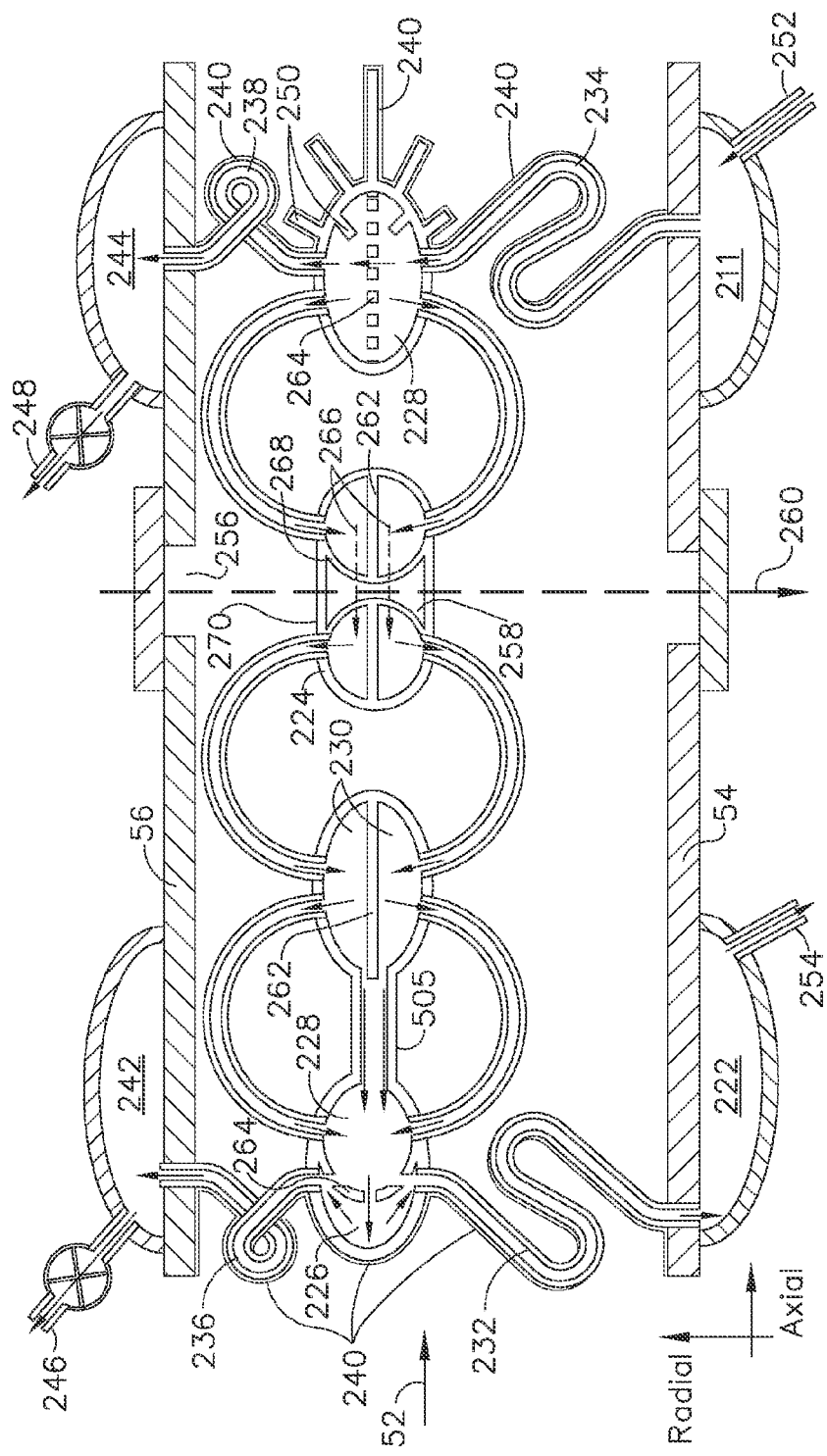

Embodiments of the disclosure provide a lightweight, conformal heat exchanger internal to a duct assembly. The heat exchanger includes a series cascade of ring manifolds and semicircular tube segments ("U" bends) for heat exchange. The U-bends are sized to increase the ratio of external convection heat transfer per U-bend surface area. The U-bend tube outside diameter and mean bend radius are selected based in part on a single isolated U-bend heat transfer correlation which models the heat transfer enhancement resulting from flow streamline trajectories and flow impingement associated with optimal selection of the U-bend tube diameter and bend radius. U-bend tube clearance selection and U-bend staggering arrangement leverage the benefit of that correlation. The heat exchanger includes several U-bends passes in series. The U-bends are incorporated into circumferential headers that allow for U-bend support, internal flow distribution, and overall heat transfer augmentation. The headers may have surface enhancements for additional heat transfer, such as internal ribs 268 and external ribs 270 (FIG. 5). The ribs 268, 270, or areas of local wall-thickening, provide structural reinforcement. The U-bends series are staggered to reduce constriction of the duct cross-section area (thereby reducing pressure drop of flow 52) as well as to assure external convection heat transfer enhancement along the exterior surfaces of the U-bends passes.

The heat exchanger design facilitates simplifying and uncluttering bay and airframe area proximate the engine by removing the fluid distribution system and associated component support and insulation material. Additional space from removal of the distribution system permits optimal placement and access of externals and controls hardware. Split manifold construction option enables welding as an alternative joining method versus brazing, thereby reducing life cycle costs including production costs and in-service costs.

In some embodiments, the heat exchanger tubes have no straight segments, only U-bends. The U-bend regions are less cluttered using circumferential and axial offsets to increase convection heat transfer coefficients. Multiple round circumferential manifolds or headers are shown, but are not mandatory. If only two manifolds are used, all tubes then traverse a continuous arcuate path w/reversing bends of constant radius, and are restrained by brackets. The manifolds or headers may have an oval, crescent, elliptical, semi-elliptical or other aerodynamic profile, with tube mounting bosses plus external and internal stiffeners. The size or diameter of the headers may be graded to facilitate reducing a flow pressure drop. Further, the headers may be split in half to permit welding an as alternative to brazing for tube-to-manifold joints.

In various embodiments, short straight segments are inserted between semi-circular tube ends and circumferential headers to increase total convection surface area. The circumferential header cross-sections may be ovalized, crescent-shaped, elliptical, semi-elliptical or of any other aerodynamic profile in order to reduce sink-side pressure drop. Moreover, cooling fins 250 (for example, pin or ring type) that extend forward and aft of the circumferential headers may be added or formed integrally with the headers. These cooling fins 250 could be located on an external or internal surface of the manifolds as shown in FIG. 5. Alternatively, the circumferential header exterior surface may be dimpled, either concave or convex, to improve convection heat transfer. Winglets may be lofted downstream of the circumferential headers to improve convection heat transfer in their downstream wake regions. A high emissivity coating 240 sprayed over specific portions or the entire exterior surface of the tubes and headers facilitates increased radiation heat transfer to bypass air flow 52.

The following description refers to the accompanying drawings, in which, in the absence of a contrary representation, the same numbers in different drawings represent similar elements.

Figure 1:
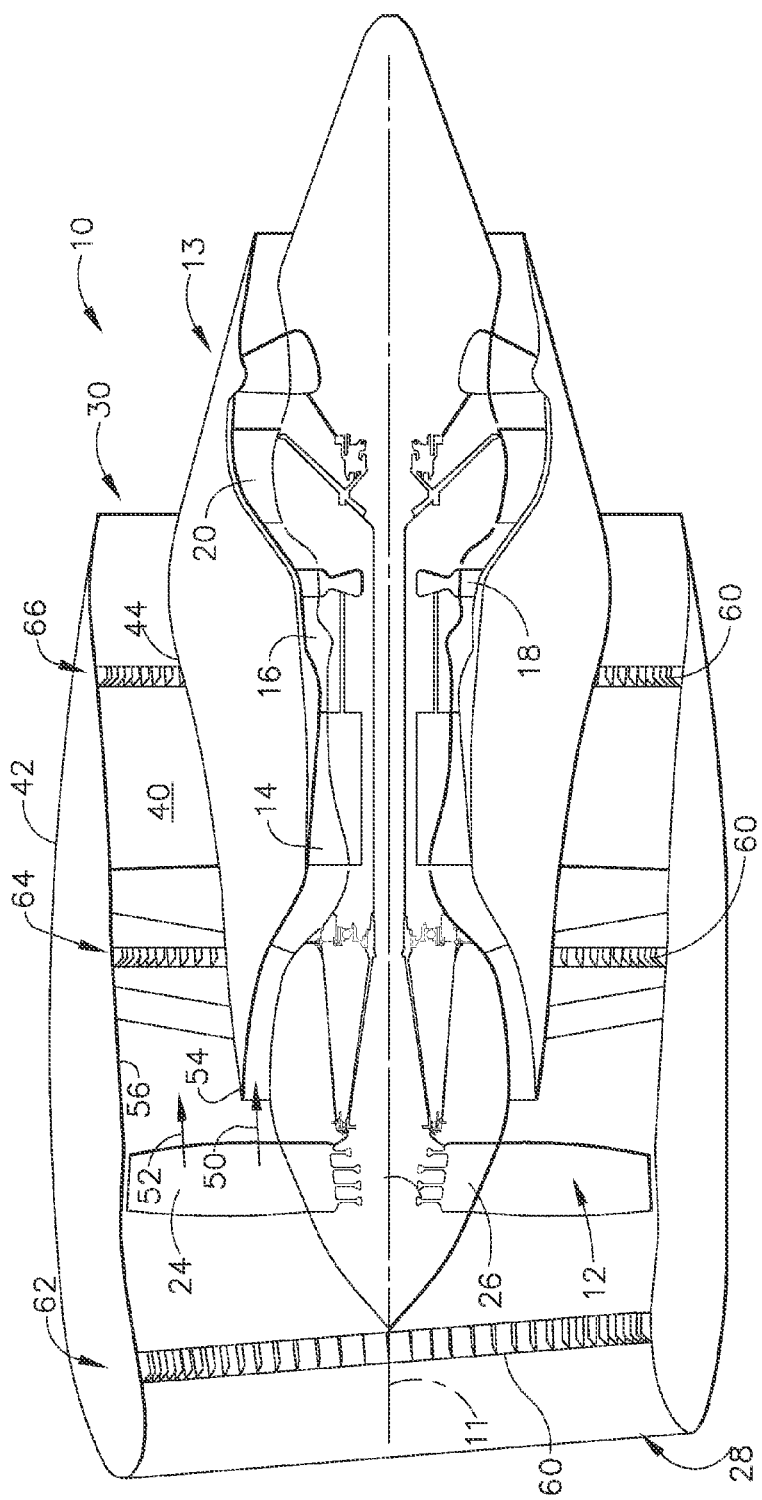

FIG. 1 is a schematic illustration of an exemplary gas turbine engine assembly 10 having a longitudinal axis 11. Gas turbine engine assembly 10 includes a fan assembly 12, and a core gas turbine engine 13. Core gas turbine engine includes a high pressure compressor 14, a combustor 16, and a high pressure turbine 18. In the exemplary embodiment, gas turbine engine assembly 10 may also include a low pressure turbine 20. Fan assembly 12 includes an array of fan blades 24 extending radially outward from a rotor disk 26. Engine 10 has an intake side 28 and an exhaust side 30.

In operation, air flows through fan assembly 12 and is split by an airflow splitter 44 into a first portion 50 and a second portion 52. First portion 50 of the airflow is channeled through compressor 14 wherein the airflow is further compressed and delivered to combustor 16. Hot products of combustion (not shown in FIG. 1) from combustor 16 are utilized to drive turbines 18 and 20 and thus produce engine thrust. Gas turbine engine assembly 10 also includes a bypass duct 40 that is utilized to bypass second portion 52 of the airflow discharged from fan assembly 12 around core gas turbine engine 13. More specifically, bypass duct 40 extends between an inner duct wall 54 and an outer duct wall 56.

In the example embodiment, bypass duct 40 includes one or more radial tubular duct heat exchangers 60 that may be positioned in a forward position 62 in bypass duct 40, a mid-position 64 in bypass duct 40, or an aft position 66 in bypass duct 40.

Figure 2:
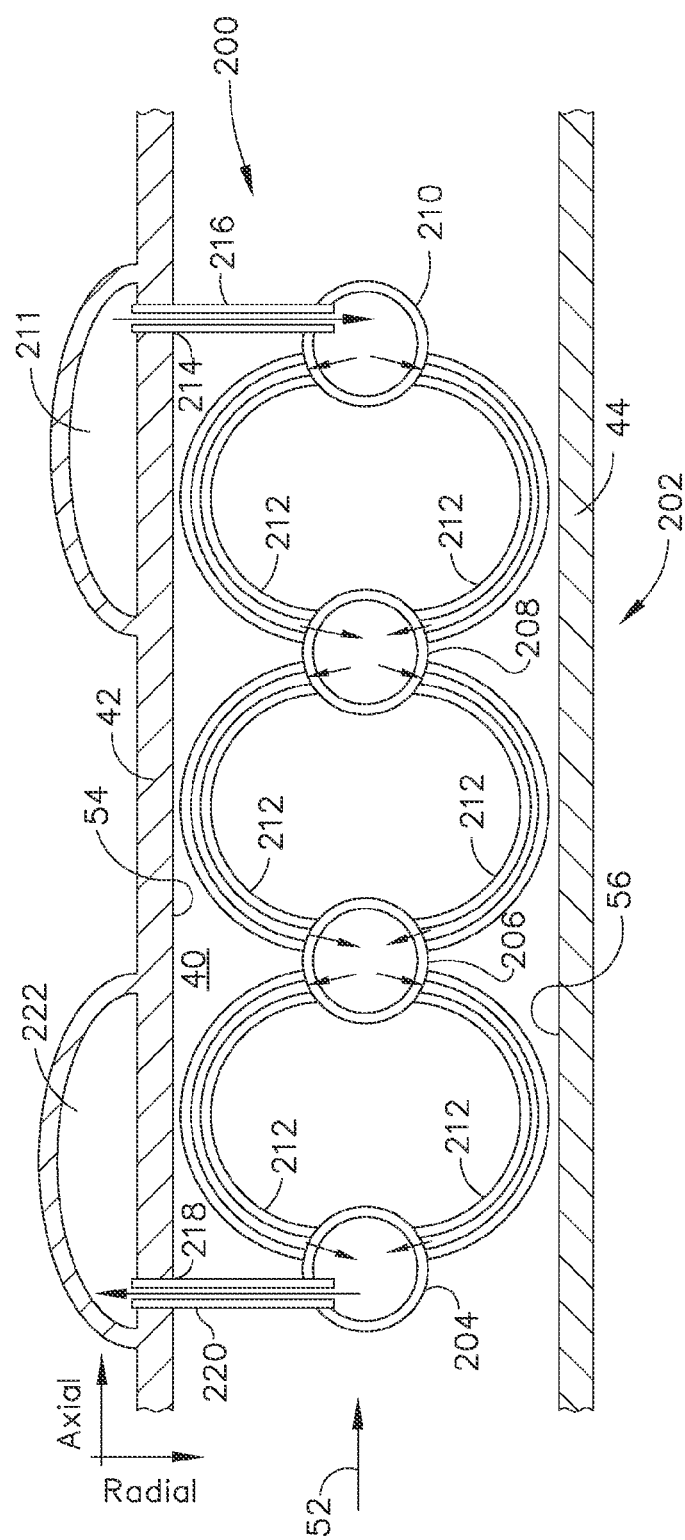

FIG. 2 is a side elevation view of a single tube group 200 of a radial tubular duct heat exchanger 202 that may be used with gas turbine engine 10 (shown in FIG. 1). In the example embodiment, tube group 200 is illustrated with four distribution headers 204, 206, 208, and 210 for clarity. Distribution headers 204, 206, 208, and 210 are spaced axially within bypass duct 40. A plurality of U-bend heat exchanger tubes 212 are coupled between adjacent distribution headers 204, 206, 208, and 210. In the example embodiment, each of U-bend heat exchanger tubes 212 include a single flow path that bends approximately 180° between respective distribution headers 204, 206, 208, and 210 that it connects. In various embodiments, other heat exchanger tube configurations are used (see FIGS. 6 and 7). An axially aft distribution header 210 is coupled to an aperture 214 extending through inner wall 54 using a straight lineheader 216 and an axially forward distribution header 204 is coupled to an aperture 218 extending through inner wall 54 using a straight header 220. The flow path between the distribution headers 204, 210 and the plenums 222, 211, respectively could be via straight line headers 220, 216, respectively. Alternately, this flow path could be formed in order to enable tri-axial thermal expansion in a coplanar or non-coplanar arrangement which is not straight. For example, coplanar headers 232, 234 and non-coplanar headers 236, 238 shown in FIG. 5 are non-limiting examples that could be used in any combination for flow between the distribution headers and the plenums. An effectiveness or efficiency of radial tubular duct heat exchanger 202 is obtained by having the appropriate number of U-bend rows in series.

Tubes 212, straight line header 216, straight line header 220 are arranged to lie in the same radial plane. However, co-planarity is neither a functional requirement nor a design constraint. As such, these components could alternatively be arranged in a non-coplanar fashion. As demonstrated by FIG. 8, groups of tubes 212 may be staggered circumferentially. Distribution headers 204, 206, 208, and 210 are arranged to run parallel to each other in a circumferential direction within bypass duct 40.

During operation, fluid enters distribution header 210 from a first fluid plenum 211 external to bypass duct 40, the fluid is directed circumferentially through distribution header 210 to any of U-bend heat exchanger tubes 212 that connect to distribution header 210. The fluid passes through tubes 212 to distribution header 208 where it mixes with other fluid entering distribution header 208. The fluid flow continues between each successive header and each section of tubes 212 that extend between those successive headers until the fluid reaches header 204, where the fluid exits header 204 through outlet header 220 to a second fluid plenum 222 external to bypass duct 40.

Figure 3:
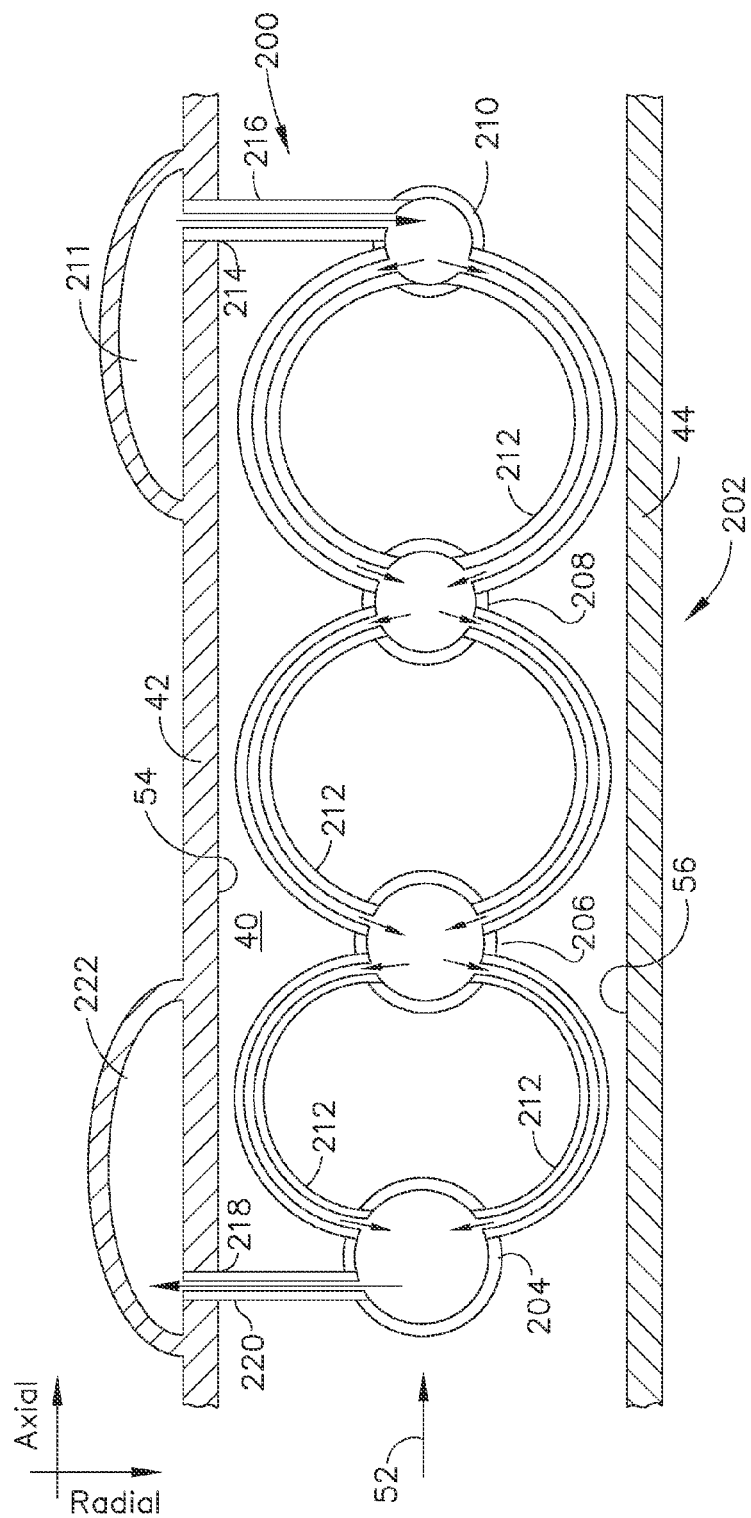
Figure 4:
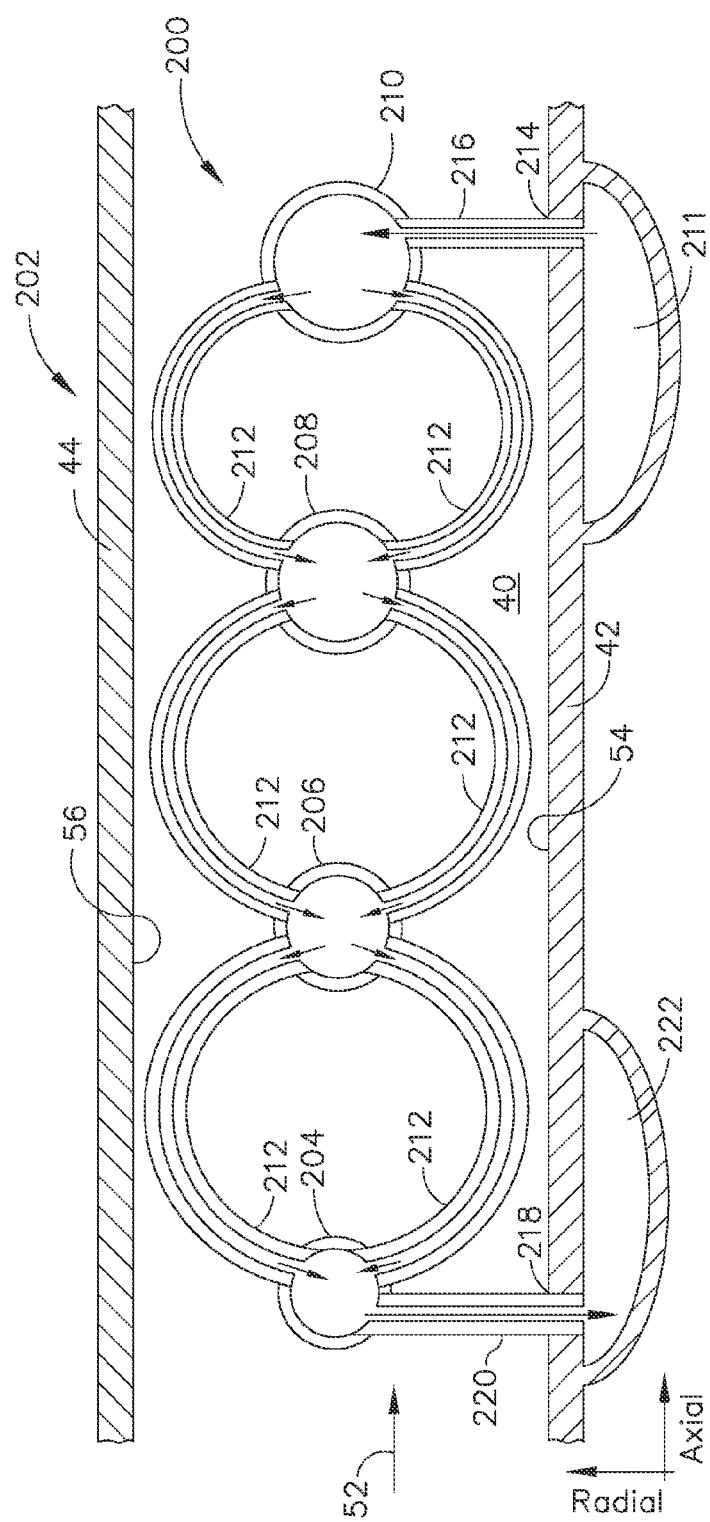

While FIG. 2 shows no change in component dimensions along the direction of fan flow, FIGS. 3 and 4 respectively illustrate various geometric variations along the direction of fan flow. Specifically, FIG. 3 shows the circumferential distribution header spacing-to-size ratio, the arcuate tube hydraulic diameter(s) and bend radius all increasing along the direction of fan flow. Alternatively, FIG. 4 shows the opposite trend in which the circumferential distribution header spacing-to-size ratio, the arcuate tube hydraulic diameter(s) and bend radius all decrease along the direction of fan flow. Any combination of header spacing-to-size ratio, arcuate tube hydraulic diameter(s) and bend radii could be contemplated.

FIG. 5 illustrates alternate configurations of a radial tubular duct heat exchanger that may be used with the gas turbine engine shown in FIG. 1. For example, FIG. 5 shows some of the potential options for shaping of the manifolds or headers including an ovalized 224, crescent-shaped 226, elliptical 228, or semi-elliptical 230 circumferential header cross-section in order to reduce sink-side pressure drop. These examples are not meant to be limiting. Other aerodynamic profiles which reduce sink-side pressure drop are considered to be in the scope of this embodiment as well. The distribution headers 204, 206, 208, 210 may or may not include a septum 262, 264 as illustrated in FIG. 5. Septum 262 is a non-perforated septum whereas septum 264 is perforated to allow fluid flow which could be transverse and/or impinging as shown in FIG. 5.

FIG. 5 additionally illustrates dual headers on each end of the system. More specifically, fluid from engine bleed 252 enters $1^{st}$ fluid plenum 211. From $1^{st}$ fluid plenum 211 fluid flows into elliptical manifold 228 where the flow splits. Some of the fluid flow passes through perforated septum 264 and continues through non-coplanar header 238 into the aft bypass manifold 244 and can then be used as bleed flow for wing anti-icing 248. Another portion of the fluid from $1^{st}$ fluid plenum 211 passes through perforated septum 264 and into the upper arcuate section of u-bend heat exchanger tubes 212. Yet another portion of the fluid from $1^{st}$ fluid plenum 211 flows through the lower arcuate section of u-bend heat exchanger tubes 212. Fluid flow from the upper and lower arcuate sections of u-bend heat exchanger tubes 212, fluid continues to flow into ovalized manifold 224. The fluid then travels around pass-through tunnel 266, upper and lower arcuate sections of u-bend heat exchanger tubes 212 and into semi-elliptical manifolds 230 which are separated by non-perforated septum 262. From semi-elliptical manifolds 230 the fluid may flow through upper or lower arcuate sections of u-bend heat exchanger tubes 212 or through hollow inter-manifold ligaments 505 into elliptical manifold 228 and crescent-shaped manifold 226 including perforated septum 264. From elliptical manifold 228, fluid flow is split 3 ways. First, it may flow through non-coplanar header 236 to forward bypass manifold and used partially as nacelle anti-icing bleed flow 246. Second, it may flow through coplanar header 232 to the $2^{nd}$ fluid plenum 222 and out fluid return flow 254. Third, it may flow through perforated septum 264 into the crescent-shaped portion of the manifold and impinge back onto perforated septum 264 leading to mixing and/or flow into the first or second direction discussed above. FIG. 5 additionally illustrates the use of hollow intra-manifold (i.e. through the pass-through tunnel 258) and hollow inter-manifold (i.e. through inter-manifold ligament 505) passages. An axisymmetric, hermetic pass-through 258 is envisioned as a converging-diverging section of an oval manifold 224 as illustrated. A bore scope or tool access port 256 and bore scope optical axis 260 is also shown in FIG. 5 as well as the manifold flow 266 around tunnel 253. Another example is the use of a hollow inter-manifold ligament 505 as a shunt flow path to reduce bleed flow pressure drop.

FIG. 6 illustrates another configuration in which tubes 212 (shown in FIG. 2) may be formed. In the example embodiment, tube 212 is formed of two straight tube sections 302 and 304 and a 180° bend section 306. Straight sections 302 and 304 couple to respective ones of distribution headers 204, 206, 208, and 210 (shown in FIG. 2), for example, headers 206 and 208.

FIG. 7 illustrates another configuration in which tubes 212 (shown in FIG. 2) may be formed. In the example embodiment, tube 212 is formed of two straight tube sections 402 and 404, two 90° bend sections 406 and 408 and a third straight section 410 positioned between 90° bend sections 406 and 408 in a serial flow arrangement. Straight sections 402 and 404 couple to respective ones of distribution headers 204, 206, 208, and 210 (shown in FIG. 2), for example, headers 206 and 208. To avoid degradation of the heat transfer enhancement physics associated with the U-bend, the length of straight section 410 must necessarily be substantially shorter than the U-bend tube bend radius. Accordingly, the intended function of straight section 410 is to provide an interface area for attaching stiffener ligaments or other non-intrusive structural reinforcement, not to increase convection heat transfer surface area.

Figure 8:
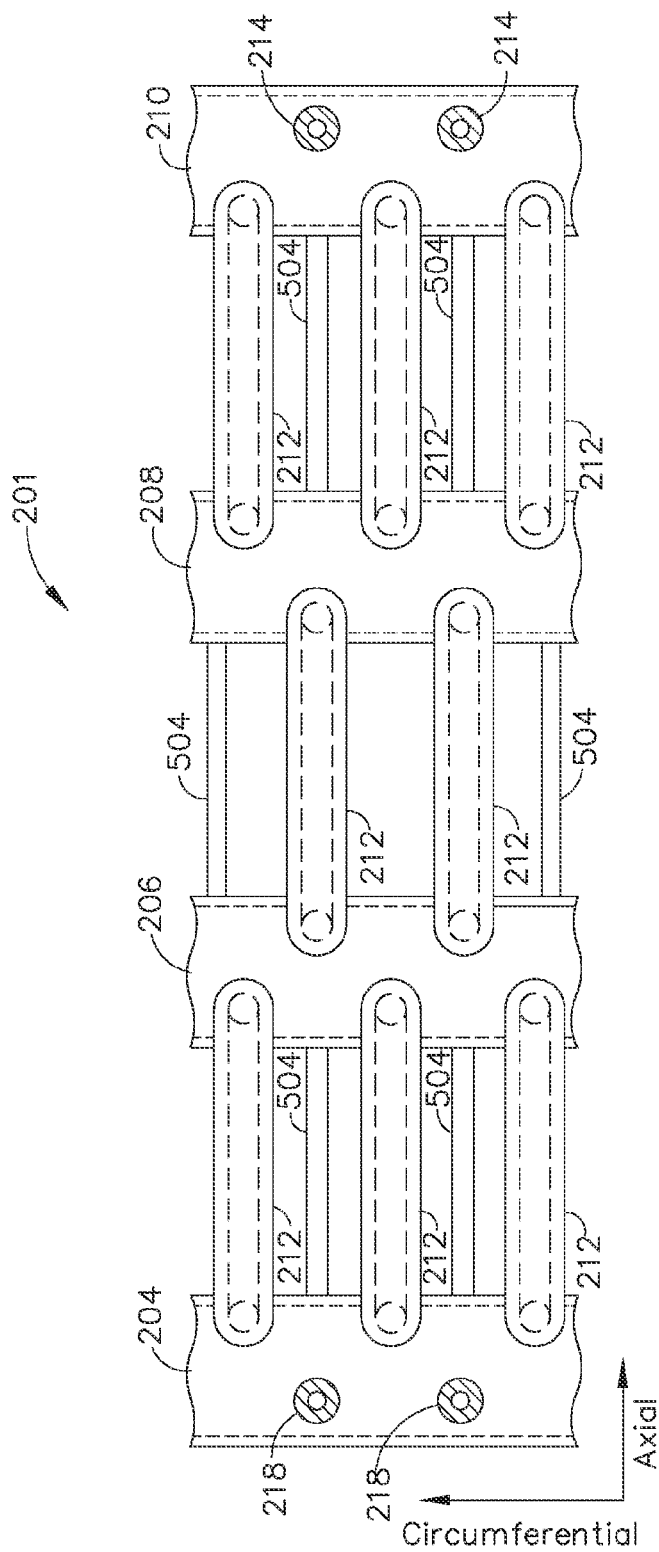

FIG. 8 is a plan view looking radially inwardly at one of a plurality of tube groups 201 of radial tubular duct heat exchanger 202. In the example embodiment, tubes 212 that connect header 204 and header 206 are circumferentially offset from tubes 212 that connect header 206 and header 208, and tubes 212 that connect header 208 and header 210 are circumferentially offset from tubes 212 that connect header 206 and header 208 and are axially in-line with tubes 212 that connect header 204 and header 206. The circumferential staggering of tubes 212 increases turbulation of the second portion 52 of the airflow discharged from fan assembly 12. The turbulated airflow permits greater convective heat exchange between second portion 52 and the fluid flow through tubes 212. Solid inter-manifold ligaments (or webbing) 504 or hollow inter-manifold ligaments 505 (FIG. 5) coupled between distribution headers 204, 206, 208, and 210 rigidize distribution headers 204, 206, 208, and 210 against deflection upon pressurization and improve modal (resonance) response. In addition, such inter-manifold ligaments (or webbing) 504, 505 also function like fins 250 to improve the portion of convection heat transfer from the manifolds to the bypass flow 52. That fin effect may be enhanced by coating the ligaments' exterior surfaces with one or more material(s) whose thermal conductivity greatly exceeds the thermal conductivity of the underlying substrate material including the ligaments. Such coating materials may include (but are not limited to) nickel, aluminum bronze, and diamond deposited by electrolytic plating, particulate spraying, chemical vapor deposition, or combinations thereof. Referring back to FIGS. 6 and 7, additional ligaments 308, 412 may be attached to and between tubes 302, 304, 402, and 404 to further improve modal (resonance) response.

Figure 9:
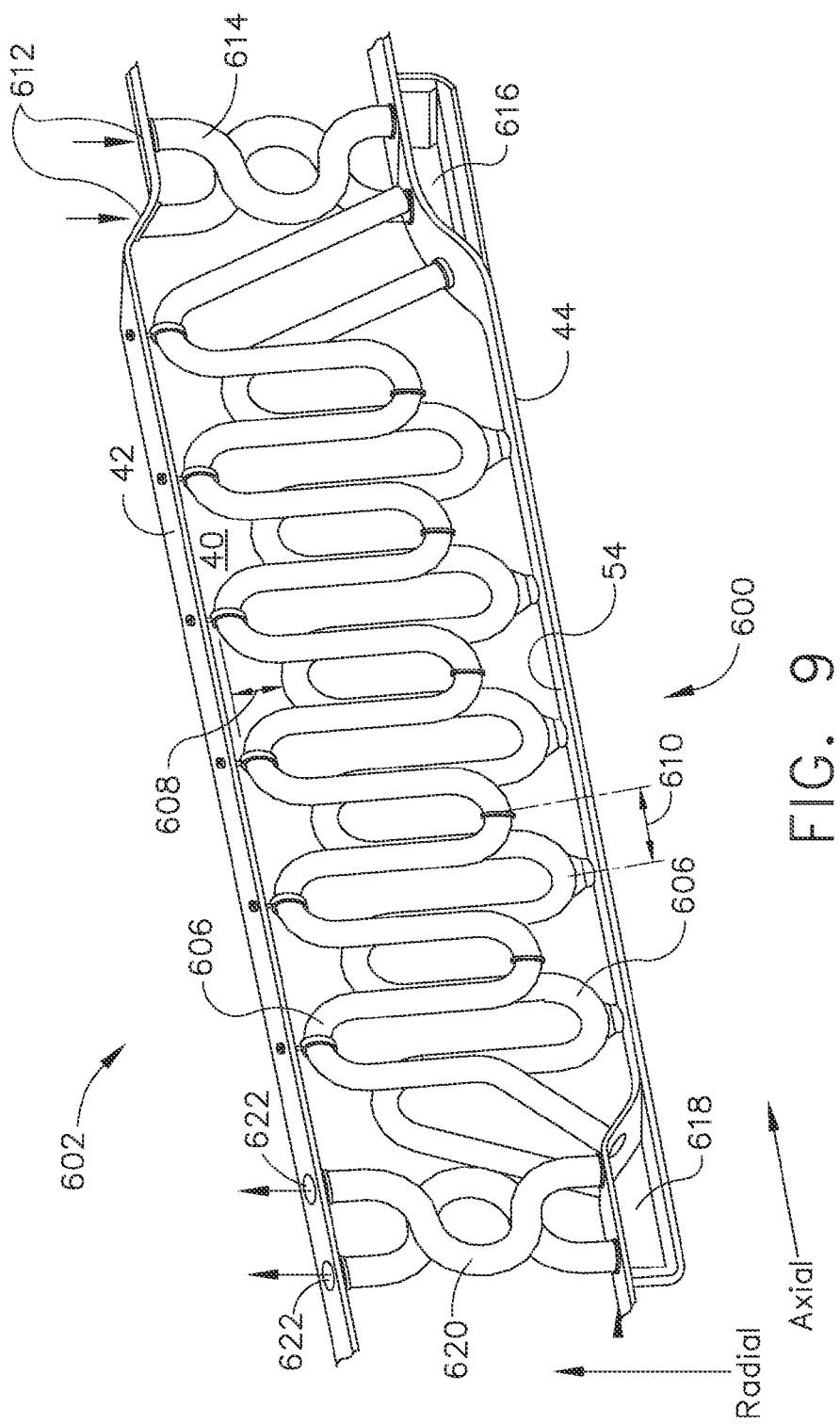

FIG. 9 is a perspective view of another embodiment of a portion of one of a plurality of tube groups 600 of a radial tubular duct heat exchanger 602. In the example embodiment, intermediate headers are not used, but rather relatively longer arcuate tubes 606 are used. Tubes 606 are offset radially a distance 608, and offset axially a distance 610. An inlet 612 directs flow through an inlet header 614 to an inlet plenum 616. Inlet plenum 616 receives inlet flows from a plurality of inlets similar to inlet 612 and provides mixing of the inlet flows before the flow is directed to a respective tube 606. Similarly, each of tubes 606 discharges into a respective outlet plenum 618 and is directed to one of a plurality of outlet header 620 and then through an outlet 622.

Figure 10:
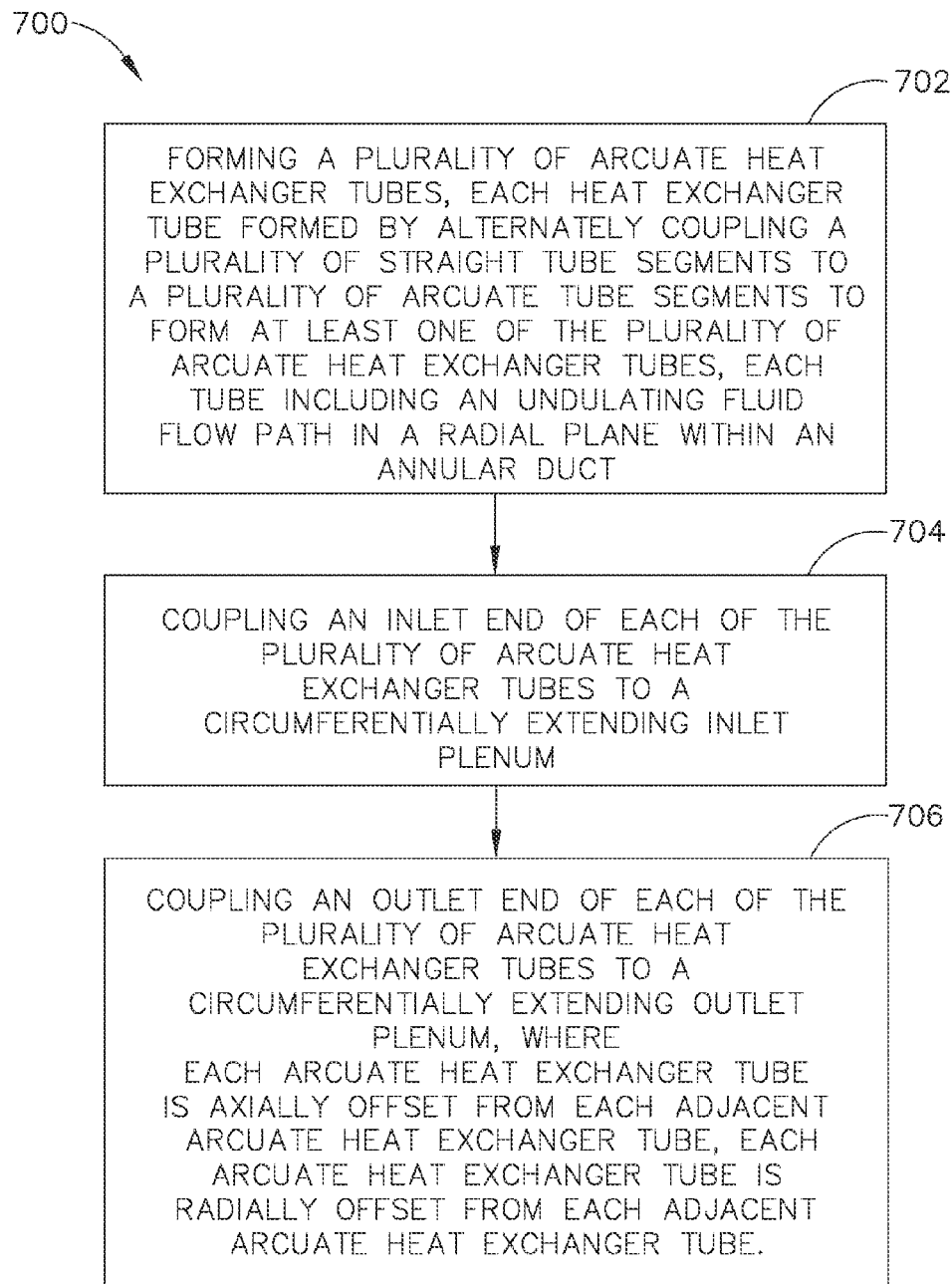

FIG. 10 is a flow chart of a method 700 of assembling a modular radial tubular duct heat exchanger that may be used with duct 40 (shown in FIG. 1). In the example embodiment, method 700 includes forming 702 a plurality of arcuate heat exchanger tubes. Each heat exchanger tube is formed by alternately coupling a plurality of straight tube segments to a plurality of arcuate tube segment to form at least one of the plurality of arcuate heat exchanger tubes. Each tube including an undulating fluid flow path in a radial plane when installed within an annular duct. Method 700 also includes coupling an inlet end of each of the plurality of arcuate heat exchanger tubes to a circumferentially extending inlet plenum and coupling an outlet end of each of the plurality of serpentine heat exchanger tubes to a circumferentially extending outlet plenum, where each arcuate heat exchanger tube is axially offset from each adjacent arcuate heat exchanger tube, each arcuate heat exchanger tube is radially offset from each adjacent arcuate heat exchanger tube.

Method 700 also optionally includes coupling an inlet end of each of the plurality of arcuate heat exchanger tubes to a circumferentially extending inlet plenum that is positioned radially inwardly from the plurality of arcuate heat exchanger tubes. Method 700 further optionally includes coupling an outlet end of each of the plurality of arcuate heat exchanger tubes to a circumferentially extending outlet plenum that is positioned radially inwardly from the plurality of arcuate heat exchanger tubes. Method 700 also optionally includes coupling at least some of the plurality of arcuate tube segments to a surface of the duct and coupling at least some of the plurality of arcuate tube segments of one of the plurality of arcuate heat exchanger tubes to an adjacent arcuate heat exchanger tube.

It will be appreciated that the above embodiments that have been described in particular detail are merely example or possible embodiments, and that there are many other combinations, additions, or alternatives that may be included.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

While the disclosure has been described in terms of various specific embodiments, it will be recognized that the disclosure can be practiced with modification within the spirit and scope of the claims.

As used herein, arcuate refers to a flow path, either in its entirety or a portion thereof, wherein the direction is gradually and partially or completely reversed at least once in a U-like pattern, and usually multiple times in an undulating pattern. For example, the U-like pattern of channels between flow path segment interfaces may be repeated multiple times in a single flow path segment.

The above-described embodiments of a method and system for radial tubular duct heat exchangers provides a cost-effective and reliable means for reducing a weight of the heat exchanger. More specifically, the methods and systems described herein incorporate U-Bend heat transfer coefficient correlations to reduce the size and weight of a tubular heat exchanger. In addition, the above-described methods and systems facilitate packaging of a large surface area for heat exchange in a uniformly distributed fluid environment. Additionally, the U-bend tubes series are staggered to enhance convection. As a result, the methods and systems described herein facilitate improving heat exchanger performance and reducing costs associated with heat exchangers in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A heat exchanger with an axial and radial dimension comprising:
   a plurality of arcuate heat exchanger segments, each of the plurality of heat exchanger segments comprising:
      a first header configured to extend circumferentially about at least a portion of a circumference of an internal surface of a fluid duct;
      a second header configured to extend circumferentially about the portion spaced axially apart from said first header in a direction opposite of fluid flow through the fluid duct; and
      a first plurality of heat exchanger tubes extending generally axially between said first header and said second header, the first plurality of heat exchanger tubes each comprising a first flow path separate from a second flow path of any other of the first plurality of heat exchanger tubes, the first flow path changing direction along the flow path from the first header to the second header, where
   each heat exchanger tube is axially offset from each adjacent heat exchanger tube, and each heat exchanger tube is radially offset from each adjacent heat exchanger tube.

2. The heat exchanger of claim 1, wherein the first flow path of the first plurality of heat exchanger tubes includes an arcuate portion that gradually changes direction along the flow path from the first header to the second header and is defined by a single bend radius of the tube.

3. The heat exchanger of claim 1, wherein the first flow path of the first plurality of heat exchanger tubes includes a straight portion and an arcuate portion, the arcuate portion is defined by a single bend radius of the tube that gradually changes direction along the flow path through the arcuate portion.

4. The heat exchanger of claim 1, wherein a first segment of said plurality of arcuate heat exchanger segments is configured to be coupled to a second segment of said plurality of arcuate heat exchanger segments.

5. The heat exchanger of claim 1, wherein an end of said first header of a first segment of said plurality of arcuate heat exchanger segments is configured to be coupled to a complementary end of said first header of a second segment of said plurality of arcuate heat exchanger segments.

6. The heat exchanger of claim 1, wherein an end of said second header of a first segment of said plurality of arcuate heat exchanger segments is configured to be coupled to a complementary end of said second header of a second segment of said plurality of arcuate heat exchanger segments.

7. The heat exchanger of claim 1, wherein at least one of said first header and said second header comprises an arcuate manifold.

8. The heat exchanger of claim 1, further comprising:
   a third header configured to extend circumferentially about the portion spaced axially apart from said second header in the direction opposite of the fluid flow through the fluid duct; and
   a second plurality of heat exchanger tubes extending generally axially between said second header and said third header, the second plurality of heat exchanger tubes each comprising a first flow path separate from a second flow path of any other of the second plurality of heat exchanger tubes, the first flow path changing direction along the flow path from the second header to the third header.

9. The heat exchanger of claim 8, wherein the second plurality of heat exchanger tubes extend in a radial plane between the second header and the third header.

10. The heat exchanger of claim 1, wherein the first plurality of heat exchanger tubes extend in a radial plane between the first header and the second header.

11. The heat exchanger of claim 1, wherein the plurality of arcuate heat exchanger segments form a series cascade of U-bend tube arrays joined to, supported, and internally-ventilated by two or more circumferential distribution headers rigidized by at least one solid inter-header ligament, at least one hollow inter-header ligament, or a combination thereof.

12. The heat exchanger of claim 11, wherein the circumferential distribution header spacing-to-size ratio increases or decreases along the direction of the fluid flow.

13. The heat exchanger of claim 11, wherein manifolds are coupled to non-coplanar headers and coplanar headers.

14. The heat exchanger of claim 11, wherein at least one circumferential distribution header comprises an oval, an oval with a transverse hermetic pass-through corridor, an elliptical, a semi-elliptical, a crescent cross-sectional shape, or a combination thereof.

15. The heat exchanger of claim 14, wherein at least one circumferential distribution header is rigidized by at least one of internal ribs, external ribs, non-perforated septum(s), perforated septum(s), or a combination thereof.

16. The heat exchanger of claim 15, wherein at least one circumferential distribution header includes external fins, internal fins, or a combination thereof.

17. The heat exchanger of claim 16, wherein at least one of the distribution headers and at least one of the distribution header external fins are coated by a heat-transfer-enhancing coating.

18. A method of assembling a modular radial tubular duct heat exchanger with an axial dimension and a radial dimension, said method comprising:
   forming a plurality of serpentine heat exchanger tubes, each heat exchanger tube formed by alternately coupling a plurality of straight tube segments to a plurality of arcuate tube segments to form at least one of the plurality of serpentine heat exchanger tubes, each tube including an undulating fluid flow path in a radial plane when installed within an annular duct;
   coupling an inlet end of each of the plurality of serpentine heat exchanger tubes to a circumferentially extending inlet plenum; and
   coupling an outlet end of each of the plurality of serpentine heat exchanger tubes to a circumferentially extending outlet plenum, where each arcuate heat exchanger tube is axially offset from each adjacent arcuate heat exchanger tube, each arcuate heat exchanger tube is radially offset from each adjacent arcuate heat exchanger tube.

19. The method of claim 18, wherein coupling an inlet end of each of the plurality of arcuate heat exchanger tubes to a circumferentially extending inlet plenum comprises coupling an inlet end of each of the plurality of arcuate heat exchanger tubes to a circumferentially extending inlet plenum that is positioned radially inwardly from the plurality of arcuate heat exchanger tubes.

20. The method of claim 18, wherein coupling an outlet end of each of the plurality of arcuate heat exchanger tubes to a circumferentially extending outlet plenum comprises coupling an outlet end of each of the plurality of arcuate heat exchanger tubes to a circumferentially extending outlet plenum that is positioned radially inwardly from the plurality of arcuate heat exchanger tubes.

21. The method of claim 18, further comprising coupling at least some of the plurality of arcuate tube segments to a surface of the duct.

22. The method of claim 18, further comprising coupling at least some of the plurality of arcuate tube segments of one of the plurality of arcuate heat exchanger tubes to an adjacent arcuate heat exchanger tube.

23. A gas turbine engine comprising:
a core gas turbine engine having an axis of rotation;
a fan casing substantially circumscribing said core gas turbine engine; and
a heat exchanger assembly with an axial and radial dimension positioned within said fan casing, said heat exchanger assembly comprising:
a plurality of arcuate heat exchanger segments, each of the plurality of heat exchanger segments comprising:
a first header configured to extend circumferentially about at least a portion of a circumference of an internal surface of a fluid duct;
a second header configured to extend circumferentially about the portion spaced axially apart from said first header in a direction opposite of fluid flow through the fluid duct; and
a first plurality of heat exchanger tubes extending generally axially between said first header and said second header, the first plurality of heat exchanger tubes each comprising a first flow path separate from a second flow path of any other of the first plurality of heat exchanger tubes, both flow paths changing direction along the flow path from the first header to the second header, where
each heat exchanger tube is axially offset from each adjacent heat exchanger tube, and each heat exchanger tube is radially offset from each adjacent heat exchanger tube.

24. The gas turbine engine of claim 23, wherein the first flow path of the first plurality of heat exchanger tubes includes an arcuate portion that gradually changes direction along the flow path from the first header to the second header and is defined by a single bend radius of the tube.

25. The gas turbine engine of claim 23, wherein the first flow path of the first plurality of heat exchanger tubes includes a straight portion and an arcuate portion, the arcuate portion is defined by a single bend radius of the tube that gradually changes direction along the flow path through the arcuate portion.

26. The gas turbine engine of claim 23, wherein a first segment of said plurality of arcuate heat exchanger segments is configured to be coupled to a second segment of said plurality of arcuate heat exchanger segments.

27. The gas turbine engine of claim 23, wherein an end of said first header of a first segment of said plurality of arcuate heat exchanger segments is configured to be coupled to a complementary end of said first header of a second segment of said plurality of arcuate heat exchanger segments.

* * * * *